May 23, 1939.  A. T. BRUNNER  2,159,652
FERTILIZER AND SEED PLANTER
Filed March 29, 1937   2 Sheets-Sheet 1
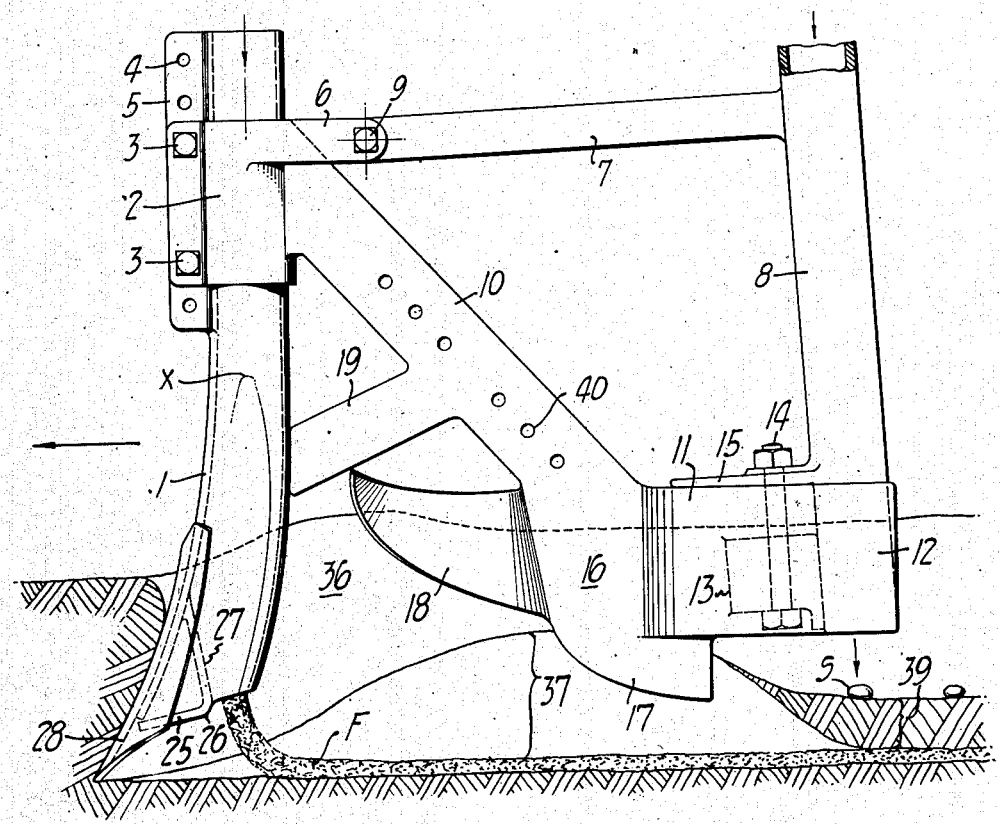
FIG_1_
FIG_2_
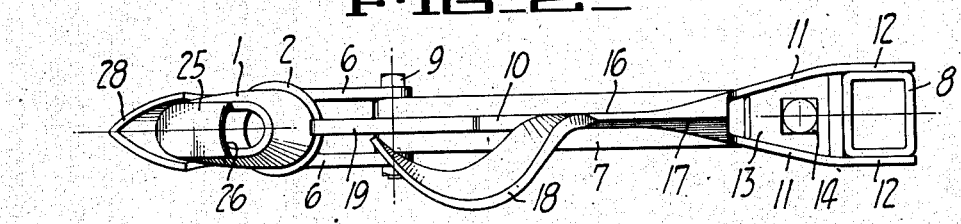
FIG_3_
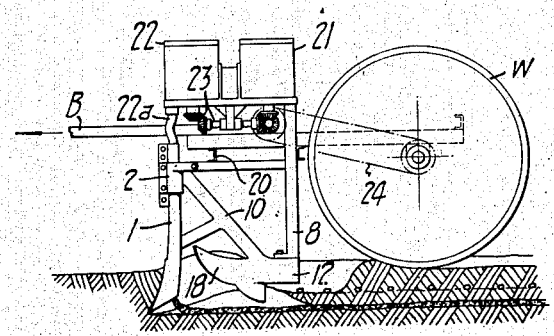
INVENTOR.
Anthony T. Brunner
BY Boyken & Mohler
ATTORNEYS May 23, 1939.  A. T. BRUNNER  2,159,652
FERTILIZER AND SEED PLANTER
Filed March 29, 1937  2 Sheets-Sheet 2
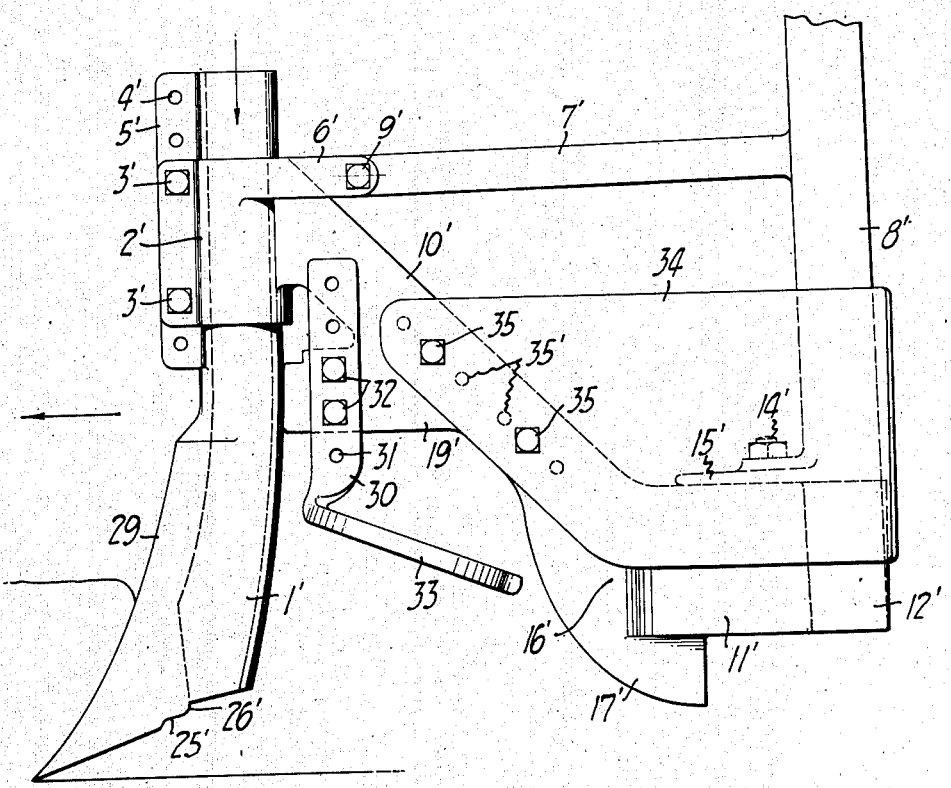
FIG_4_
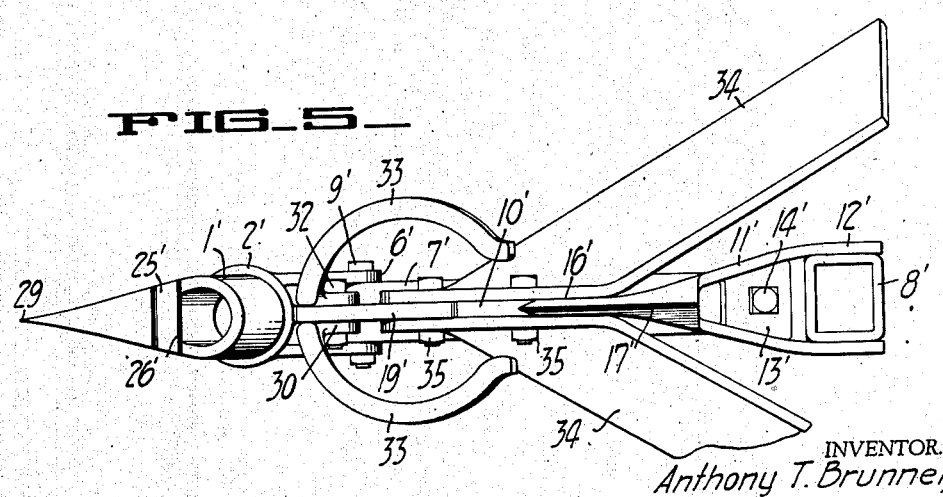
FIG_5_
INVENTOR.
Anthony T. Brunner
BY
Boyken & Mohler
ATTORNEYS Patented May 23, 1939

2,159,652

UNITED STATES PATENT OFFICE 2,159,652

FERTILIZER AND SEED PLANTER

Anthony T. Brunner, Half Moon Bay, Calif.

Application March 29, 1937, Serial No. 133,551

8 Claims. (Cl. 111—73)

This invention relates to fertilizing and seed planting devices and has for its objects the provision of means associated with a seed planter adapted to form a relatively deep furrow for the seeds in broken or unbroken soil with a minimum of exposure of sub-surface soil to the sun, and to deposit a layer of powdered or liquid fertilizer in the bottom of said furrow at a level substantially below the level of the seeds deposited therein. A further object is a construction in means as above described to insure against obstruction of the flow of fertilizer to the soil and a still further object is the provision of a device in association with the aforesaid means and seed planter adapted to insure positive covering of the fertilizer with a layer of earth of a predetermined thickness as desired, prior to the deposit of the seeds by the planter. Other objects and advantages will appear in the specification and drawings annexed hereto.

Fig. 1 is an elevational view of the fertilizer and planter devices in assembled relation as they would appear in operation in the soil.

Fig. 2 is a bottom plan view of the fertilizer and planter elements shown in Fig. 1.

Fig. 3 is a reduced diagrammatic elevational view of the fertilizer and planter elements mounted on a planter indicated.

Fig. 4 is an elevational view of a slightly different form of the invention.

Fig. 5 is a bottom plan view of the devices of Fig. 4.

Briefly described, my invention, herein described, is for use in combination with a row-crop planter for planting rows of beans, peas, corn, cotton and the like, the seeds of which require planting to a depth of from about one to eight inches and the deposit of the fertilizer is at a depth considerably below the seeds, the vertical distance between the seeds and fertilizer ranging from about one to five inches. It is highly important that the seed be planted at a point sufficiently rearwardly of the fertilizer device (relative to the direction of movement of the latter) in order to insure covering the fertilizer with the desired layer of earth prior to depositing the seed in the furrow, so as to preclude all possibility of burning the seed by contact between the same and the fertilizer. Inasmuch as many of the powdered fertilizers either dissolve or become quickly disintegrated upon being deposited in the moist soil, it is necessary that the layer of soil between the fertilizer and seeds be substantial, and in dry regions it is highly important that the minimum amount of soil in the furrow be exposed to drying action of the sun and air. The use of my invention accomplishes these beneficial results as well as others that will become apparent from the description and drawings.

In Fig. 1 in the drawings, the fertilizer device comprises a generally vertically extending open ended fertilizer feed tube or pipe 1 having supporting bracket 2 secured thereto by bolts 3 extending through openings 4 in a rib 5 projecting from the forward side of the tube. The terms "forwardly" and "rearwardly" and "forward" and "rear" are used in this description relative to the normal forward movement of the device in operation, as indicated by the arrows in Figs. 1 and 4.

The bracket 2 is adjustable vertically on the tube 1 by merely changing the position of the bracket and tube relatively and inserting the bolts in the openings in the rib 5 that come into register with the bolts, the bracket 2 being formed to encircle the pipe.

Projecting rearwardly from bracket 2 are a pair of ears 6 adapted to lie on opposite sides of the outer end of an arm 7, which arm extends forwardly of and may be formed integrally with the conventional seed planting pipe 8 of an ordinary planter of the type adapted to plant seeds in from one to a half dozen rows or so, according to the number of seed pipes. Arm 7 removably connects to ears 6 by a bolt 9.

Projecting rearwardly and downwardly from bracket 2 is an arm 10 comprising a relatively wide flat strip of relatively heavy metal disposed in a vertical plane, which arm carries at its lower and outer end integrally therewith a pair of flat plates 11, that extend horizontally, and divergently, rearwardly from the lower end of arm 10 as best seen in Fig. 2. The rear end portion 12 of these plates 11 are disposed substantially parallel to lie on opposite sides of the lower end of the pipe 8, and the portions 12 are spaced apart a greater width than the thickness of tube 1 at the lower end of the latter.

Extending between the divergently extending portion of plates 11 is a bridge member 13 secured to the plates, which member is vertically apertured to receive a vertical bolt 14, said bolt also extending through an opening in a lug 15 on pipe 8 that extends forwardly therefrom, thereby removably securing the pipe 8 and plates rigidly together. The lower end of the pipe 8 terminates at an elevation above the lower edges of plates 11 and portions 12 thereof.

Along the forward juncture of plates 11, the arm 10 extends downwardly as at 16 in a vertical plane, and terminates at its lower end in a rearwardly extending, keel-like fin member 17, the sides of which fin extend divergently from each other in a rearward direction, said fin projecting below the lower horizontal edges of plate 11 and terminating at its rear end in a square vertical shoulder of wedge shaped outline, at a point spaced forwardly of the lower open end of pipe 8.

This fin 17 is wedge shaped both in a horizontal and vertical direction, the sharpened forward and lower edges thereof, in outline, forming a continuous downwardly and rearwardly extending curve, (Fig. 1).

Connecting with the portion 16 of the arm 10 and projecting forwardly therefrom is plate 18, its lower edge being formed upwardly and forwardly on continuation of the edges of the fin 17 to a point slightly rearwardly of and directly behind tube 1, and in substantial engagement with a brace plate 19 that extends forwardly of arm 10 to merely engage against the rear side of tube 1. This plate 18 is twisted out of a vertical plane and to one side of the vertical plane in which the fin 17 is disposed so that one of its sides faces generally downwardly for a purpose later to be described.

The tube 8 is mounted on the frame 20 (Fig. 3) of the planter which frame supports the seed hopper 21 and the fertilizer hopper 22. The feed hoppers 21, 22 each include conventional agitating means (not shown) for insuring the spaced dropping of the seeds and continuous feeding of the fertilizer, the agitating means on the separate hoppers being connected together for simultaneous operation, as by a shaft and gears 23 all driven from a drive sprocket chain 24 connecting with the ground wheels W of the planter, so that forward movement of the planter as by a source of power connected to draw bar B, will cause simultaneous operation of the fertilizer and seed planting devices. A flexible pipe 22a connects between the hopper 22 and tube 1 to permit vertical adjustment of the latter relative to the hopper.

The lower end portion of tube 1 commencing at point x, is curved forwardly, as indicated in Fig. 1, and the lateral sides, (as distinguished from front and rear sides) are flattened to decrease the resistance to forward movement of the tube through the ground, and to also reduce to a minimum the amount of subsoil exposed during such movement.

The lower end edges of tube 1 are slanted upwardly from front to rear, and a closure plate 25 closes substantially the forward half of the open end of the tube, said plate being slanted generally similarly to the inclined lower edges of the tube, and being disposed downwardly relative to the lower edges of the tube 1, its lower surface is substantially below the lower edges of the latter, thus forming a rearwardly facing shoulder 26 adjacent the opening remaining uncovered in the lower end of said tube. A plate 27 inclines upwardly, from said shoulder into the tube to connect with the forward inner sides thereof to direct the fertilizer F out of the opening.

The forward outer side of the lower end of the tube 1 is provided with a furrow forming blade 28, having a sharply pointed lower end, said blade being formed in cross section to partially embrace the forward side of the lower end of the tube 1. In Figs. 4, 5, the fertilizer tube 1' and seed pipe 8' are in an arrangement similar to that shown in Figs. 1 to 3 and the other similarly arranged parts are numbered the same as in Figs. 1 to 3, but the numerals are primed. In this form of device, which is most suitable for planting cotton seeds, a furrow forming cutting edge is disposed along the forward side of the fertilizer tube 1', which blade extends well up on the tube to about the point of rib 5'. This cutting blade 29 is curved forwardly from its upper end to form a sharply pointed, downwardly and forwardly directed lower end. In Fig. 5, it will be seen that the tube 1' is flattened slightly with its lateral sides extending divergently from the forward side so that the sides of the blade 29 will be in substantial forward continuation of the lateral sides of the tube to an apex forming the cutting edge of the blade. In this form of device, the lower, upwardly inclined side of the blade 29 is imperforate and terminates at its rear margin in a plate 25' that partially covers the lower open end of tube 1' in substantially the same manner as plate 25 and forms a rearwardly facing shoulder 26'.

The arm 10' connecting between the bracket 2' and seeder pipe is formed with a fin 17', similar to fin 17 in Fig. 1, and also is formed with divergently extending plates 11' to which the seeder is secured at its lower end as described relative to Figs. 1, 2. The fin 17', extends upwardly at its forward end in the same vertically disposed plane to connect at its upper end with the forward side of the arm 10'. The forward edge of fin 17' is sharpened to facilitate its passage through the soil, and the sides form both a forwardly and downwardly directed wedge shape with the sharpened edges at the apex.

Supported from brace plate 19' is a pair of vertically extending metal strips 30, each formed with a vertically extending row of holes 31 for adjustably securing the strips at various heights, to the brace plate 19' by bolts 32. The lower ends of strips 30 are each provided with an arcuately shaped bar 33 extending rearwardly and slightly downwardly from the strips toward the convexly extending sides of the fin 17'. The convexly extending sides of the bars face each other and the bars are disposed in the same inclined plane, whereby the middle portions of the bars will project laterally outwardly of the plane in which the tube 1' and seeder 8' are disposed.

In addition to the plates 11', I also provide a pair of wide plates 34 in substantially vertically extending planes at opposite sides of the plates 11'. The plates 34 are adjustably secured to arm 10' by means of bolts 35 extending through holes 35' in arm 10' for adjustably securing the plates 34 at the elevation desired, and said plates extend rearwardly, divergently outwardly, from their connection with arm 10', the angle of divergence being appreciably greater than the angle of divergence of plates 11'. Also the lower edges of plates 34 are disposed appreciably higher than the lower edges of plates 11'.

Referring to Figs. 1 to 3, in operation the wheel mounted planter frame, carrying the fertilizer and planter unit as described, is drawn in the direction of the arrow. Any desired number of said fertilizer or planter units may be supported on the frame according to the number of rows it is desired to fertilize and to plant. Upon such forward movement the blade 28 on pipe 1 forms a narrow, relatively deep furrow, throwing the dirt upwardly to both sides as at 36 and the fertilizer F flows in a ribbon-like stream in the bottom of the furrow. As the planter advances the plate 18 engages the soil 36 throwing it onto the fertilizer F immediately after the latter is deposited, covering the same to a depth 37, as determined by the position of bracket 2 relative to the tube. The fins 12 and plates 11 then force the soil in the furrow apart, at a point above the fertilizer, the fins acting to form a clear space just ahead of the lower end of the seed pipe 8, so as to permit the seeds S to drop freely onto the soil, leaving from one to five inches of soil between the seed and fertilizer as indicated at 39, as may be desired. Conventional means on the planter then acts to further cover the seeds, such means being spaced dished rims on wheels W on the planter or other devices well known in the art.

The plate 25 and shoulder 26 at the lower end of the fertilizer tube is very important, since this plate acts to prevent soil clogging the opening in the lower end of the tube 1, since a clear space rearwardly of the shoulder is left for the falling fertilizer.

In the form shown in Figs. 4, 5, the cutting blade 29 acts to cut a very narrow furrow in broken or unbroken soil, without exposing more soil than is necessary to drying effect of the atmosphere, and this blade will cut very deep, up to about ten inches or more, thus reaching moist soil. The bars 33 function to cover the fertilizer from both sides of the furrow and the fin 17' functions similar to fin 17 in Figs. 1 to 3, as described.

It will be noted in both forms of devices, that no space is left between the fertilizer tube and seed pipe for accumulation of weeds, grass, etc., since the plate 18 (Fig. 1) and bars 33 (Fig. 4) are disposed at their forward ends directly behind pipe 1 and 1' respectively. In Figs. 4, 5, the plates 34 act to scrape away a small amount of earth at about the surface of the ground to form small ridges of earth on each side of the furrow. In cotton planting, this earth is later on scraped back to a position over the seeds, after the seeds have sprouted, and is an important feature. It is, of course, obvious that the same plates may be positioned on the device of Figs. 1 to 3, holes 40 being provided in arm 10 for that purpose.

From the foregoing it will be apparent that my device is not suitable for merely fertilizing soil for planting grass seed and the like, wherein the surface of the ground is merely scratched. Heretofore loss in crops from seed burned by the fertilizer or dried out from excessive dryness of the soil due to excessive cultivation thereof and consequent exposure of a great amount of the soil to the sun, has been very large. Particularly is this true where the crops are beans, peas, corn, cotton and the like. With my device all these objections have been overcome with a resulting saving to the farmer, not only of the crops, but of one-half the labor required since the fertilizing and planting is done simultaneously.

Having described my invention, I claim:

1. In a device of the character described, a pair of generally vertically extending, horizontally spaced tubes open at their lower ends, means mounting said tubes for simultaneous movement of their lower ends through the ground horizontally in one direction and in a single plane, the forward tube of the pair, relative to the direction of movement of the tubes, being provided with a knife-like blade secured against the forward side of the tube, the cutting edge of said blade extending alongside the forward side of the forward tube from adjacent the lower end thereof to above the surface level of the ground and the width of the blade transversely of the direction of movement of the tube being substantially the width of the tube whereby the blade will cut a furrow in the ground substantially the width of the forward tube only and cutting edge thereof will cut through relatively hard packed soil including roots and vegetation upon movement of said tubes in said direction, means for feeding fertilizer into said forward tube for dropping therethrough into said furrow and means for feeding seed into the other tube for dropping seed into the furrow, and soil engaging means between said tubes arranged and adapted to engage and draw soil at the side of the furrow on the fertilizer therein before the seed is deposited into the furrow, and means securing said forward tube and said soil engaging means together for securement and removal from said other tube as a unit separate from said other tube.

2. In a device of the character described a wheel mounted frame, adapted for movement in one direction over the ground, a generally vertically extending pipe for fertilizer and a generally vertically extending tube for seed, said pipe and said tube each having a discharge opening at its lower end for discharge of the fertilizer and seed respectively, means securing the pipe and tube to said wheel mounted frame for movement therewith in a common vertical plane and with the lower end of the pipe projecting downwardly to below the level of the ground with the lower end of the pipe at a lower level than the lower end of the tube, a vertically extending cutting blade having a vertically extending cutting edge secured to the forward side of the pipe for cutting a furrow in the soil upon movement of the pipe and tube through the ground, furrow spreading means secured to the pipe and tube and extending forwardly of the lower end of the tube arranged and adapted to spread the soil in the furrow to opposite sides of the tube, a plate formed on said furrow spreading means and disposed in forward extension thereof curved out of said vertical plane intermediate its ends and having one of its sides inclined to face downwardly and laterally toward the furrow whereby the outwardly projecting portion of the plate will engage soil at one side of the furrow and will cause the same to be drawn into said furrow, the forward and rear ends of said plate being disposed substantially in said vertical plane and the lower edge of said plate being curved downwardly from the end thereof adjacent the pipe.

3. In a construction as defined in claim 2, means on said plate adjacent the end thereof nearest said tube projecting downwardly below the lower end of the tube arranged and adapted to move through the soil drawn into the furrow by said plate.

4. In combination with a seed planter having a seed planting tube, a fertilizer distributing unit for attachment to and for removal from said seed planting tube, as a unit, comprising a vertically extending open ended fertilizer pipe for fertilizer having a furrow forming blade at its lower end, pipe supporting means projecting laterally from the side of said pipe opposite the furrow forming blade, means for removably securing said supporting means to the seed planting tube and said supporting means carrying a soil engaging blade arranged and adapted to engage the soil at one side of the furrow formed by said furrow forming blade and to draw soil back into the furrow upon movement of the furrow forming blade for forming a furrow.

5. In a construction as defined in claim 4, said supporting means comprising a brace connecting between the upper end of the fertilizer pipe and the lower end of the seed planting tube, and means rigidly securing said supporting means to the fertilizer pipe in a position for supporting the fertilizer pipe with its lower open end below the level of the lower end of the seed planting tube.

6. An attachment for a planter having a generally vertically extending seed planting tube and a portable wheel mounted frame supporting said tube for movement in one direction along a path of travel, said attachment comprising a generally vertically extending open ended fertilizer pipe for fertilizer, means detachably securing said fertilizer pipe to the seed planting tube forwardly of the seed planting tube relative to the normal directional movement of the latter and in the plane of said movement, said means comprising a brace extending between the seed planting tube and fertilizer pipe, means rigidly securing one end of said brace to the seed planting tube and means adjustably securing the opposite end of the brace to the fertilizer pipe for engaging the pipe at a plurality of positions along the vertical length of the pipe as desired, a furrow forming blade at the lower end of the fertilizer pipe for forming a furrow for the seed planting tube, the means detachably securing the fertilizer pipe to the seed planting tube being secured to the fertilizer pipe for removal therewith from the seed planting tube as a unit.

7. In a construction as defined in claim 6, said brace being disposed to extend from the lower end of the planting tube upwardly toward the fertilizer pipe, and a furrow forming blade being formed integrally with the lower end of the brace adjacent the lower end of the seed planting tube.

8. An attachment for a planter having a generally vertically extending seed planting tube and a portable wheel mounted frame supporting said tube for movement in one direction along a path of travel, said attachment comprising a generally vertically extending, open ended fertilizer pipe for fertilizer, a supporting brace secured at one end to the lower end of said tube and secured at its opposite end to said pipe, said pipe being positioned in advance of the tube relative to the direction of movement of the latter and in the plane of such movement, a furrow forming blade on the lower end of said pipe for forming a furrow in the soil in advance of the seed tube, and separate soil engaging means secured to said brace respectively positioned and arranged and adapted to engage soil at the side of the furrow formed by said blade to draw said soil into the furrow and to form a furrow in the soil so drawn into the furrow at a point adjacent and below the lower end of the seed planting tube, said fertilizer pipe, brace and separate soil engaging means all being secured together as a unit, and means removably securing said fertilizer pipe, brace and separate means to the seed tube for attachment thereto and removal therefrom as a unit.

ANTHONY T. BRUNNER.